(12) United States Patent
Maercovich et al.

(10) Patent No.: US 7,510,166 B2
(45) Date of Patent: *Mar. 31, 2009

(54) AUTOMATIC FLUSH ACTUATION APPARATUS

(76) Inventors: Jorge Maercovich, 19560 Wilshire Blvd., #903, LA, CA (US) 90024; Leo Maercovich, 1751 S. Bentley Ave., #1, LA, CA (US) 90025; Shao-Kuang Liu, #Alley 11, Lane 3, Jung-jou Rd., tu Cheng City, Taipei Hsien (TW)

( * ) Notice: Subject to any disclaimer, the term of this patent is extended or adjusted under 35 U.S.C. 154(b) by 473 days.

This patent is subject to a terminal disclaimer.

(21) Appl. No.: 11/260,881

(22) Filed: Oct. 26, 2005

(65) Prior Publication Data

US 2007/0170383 A1 Jul. 26, 2007

Related U.S. Application Data

(63) Continuation-in-part of application No. 11/004,704, filed on Dec. 3, 2004, now Pat. No. 7,028,977.

(51) Int. Cl.
*E03D 5/10* (2006.01)
(52) U.S. Cl. .................. 251/129.03; 251/129.04; 251/40; 4/304
(58) Field of Classification Search ............ 251/129.03, 251/129.04, 40; 4/302, 304, 314
See application file for complete search history.

(56) References Cited

U.S. PATENT DOCUMENTS

| 5,125,621 | A | * | 6/1992 | Parsons et al. ......... 251/30.03 |
|---|---|---|---|---|
| 5,244,179 | A | * | 9/1993 | Wilson ................. 251/30.03 |
| 5,482,250 | A | * | 1/1996 | Kodaira ............... 251/129.04 |
| 5,636,652 | A | * | 6/1997 | Toschi et al. ............... 137/1 |
| 5,680,879 | A | * | 10/1997 | Sheih et al. ............. 137/240 |
| 5,895,844 | A | * | 4/1999 | Krueger ................. 73/114.72 |
| 6,000,674 | A | * | 12/1999 | Cheng .................... 251/26 |
| 6,019,343 | A | * | 2/2000 | Tsai ................... 251/30.02 |
| 6,056,261 | A | * | 5/2000 | Aparicio et al. ....... 251/129.03 |
| 6,382,586 | B1 | * | 5/2002 | Wilson et al. ............. 251/40 |
| 6,659,420 | B2 | * | 12/2003 | Hwang et al. ............. 251/26 |
| 6,845,524 | B2 | * | 1/2005 | Hwang .................... 4/304 |
| 6,877,679 | B2 | * | 4/2005 | Lawes .................. 239/585.1 |

* cited by examiner

*Primary Examiner*—John Rivell
*Assistant Examiner*—Cloud K Lee
(74) *Attorney, Agent, or Firm*—Raymond Y. Chan; David and Raymond Patent Firm

(57) ABSTRACT

An automatic flush actuation apparatus, which is incorporated with a flushing system having a water inlet, a water outlet, and a water chamber communicating therebetween, that includes a valve member being moved by a flush lever for releasing the water pressure within the water chamber to allow the water passing from the water inlet to the water outlet, and a sensor-operated powering assembly including a relief valve provided at the valve member for controlling the water flowing to the water outlet and an actuator arranged in such a manner that while sensing a presence of a user of the flushing system, the actuator is driven to move the relief valve to an opened position for releasing the water pressure within the water chamber to allow the water passing to said water outlet.

14 Claims, 13 Drawing Sheets

AUTOMATIC FLUSH ACTUATION APPARATUS

CROSS REFERENCE OF RELATED APPLICATION

This is a Continuation-In-Part application of a non-provisional application, having an application Ser. No. 11/004,704 and a filing data of Dec. 3, 2004 now U.S. Pat. No. 7,028,977.

BACKGROUND OF THE PRESENT INVENTION

1. Field of Invention

The present invention relates to a toilet and urinal facility, and more particularly to an automatic flush actuation apparatus which is capable of incorporating with a conventional commercial manual restroom flushing system, such as urinal and water closet, so as to selectively operate the automatic flush actuation apparatus automatically through the use of a sensor or normally through an actuation lever.

2. Description of Related Arts

Manual operated toilet room flush valves for use on urinals and water closets in public restrooms are well known. As shown in FIG. 1, a conventional manual operated automatic flush actuation apparatus comprises a valve body A1 having a water inlet A11 and a water outlet A12, a diaphragm A2 having a water channel A21 communicating between the water inlet All and the water outlet A12, a relief valve A3 disposed at the diaphragm A2 for blocking the water flowing from the water inlet A11 to the water outlet A12 through the water channel A21, and a flush lever A4 arranged to move the relief valve A3 at a position that the water is allowed to flow to the water outlet A12 for completing the flushing operation.

For hygiene purposes, an automatic operated toilet room flush valve is developed. For example, U.S. Pat. Nos. 5,169,118 and 5,244,179 disclose a solenoid operated automatic flush valve which is battery-operated and utilizes a latching solenoid to limit power drain on the battery. Accordingly, when the infrared sensor detects the presence of a user of a urinal or toilet, the flush valve is automatically driven to open to complete the flushing operation. However, the flush valves, according to the above patents, have several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

In addition, the structural design of the solenoid operated automatic flush valve is different from that of the manual operated flush valve. In other words, when the flushing system is incorporated with the solenoid operated automatic flush valve, the flushing system will lose the mechanical-manual operated feature. Therefore, there is no alternative to operate the flushing cycle when the solenoid operated automatic flush valve has failed to operate.

In order to install the solenoid operated automatic flush valve into the conventional flushing system, the mechanical-manual operating mechanism of the flush valve must be totally removed, which is a waste of resources in order to incorporated with the solenoid operated automatic flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

SUMMARY OF THE PRESENT INVENTION

A main object of the present invention is to provide an automatic flush actuation apparatus which is adapted to control a flow of water by an electric motor, so as to enhance the reliable of the operation of the automatic flush actuation apparatus.

Another object of the present invention is to provide an automatic flush actuation apparatus which is adapted for incorporating any water system, such as a flushing system, a faucet system, showering system or even a water piping system, to control the water flow therethrough.

Another object of the present invention is to provide an automatic flush actuation apparatus which is capable of incorporating with a conventional commercial manual restroom flushing system, such as urinal and water closet, so as to automatically operate the flush valve through the use of a sensor.

Another object of the present invention is to provide an automatic flush actuation apparatus without altering the original structural design of the manual operated flush valve in order to incorporate with the present invention. Therefore, the user is able to mechanically-manually operate the flushing cycle for the restroom flushing system if the automatic operation system is not functioning properly.

Another object of the present invention is to provide an automatic flush actuation apparatus which is reliable and that can be easily installed and maintained.

Another object of the present invention is to provide an automatic flush actuation apparatus, wherein a covering cap has a battery opening that allows a power source exposing to outside. Therefore, any individual is able to simply replace the power source without detaching the covering cap from the flushing system, so as to reduce the maintenance cost of the present invention.

Another object of the present invention is to provide an automatic flush actuation apparatus, wherein the covering cap further has a sensor opening that allows a CPU exposing to outside. Therefore, any individual is able to make adjustments via the sensor switch through the CPU opening without detaching the covering cap from the flushing system.

Another object of the present invention is to provide an automatic flush actuation apparatus, which is powered by an electric motor so as to avoid water damage and to enhance performance and reliability.

Another object of the present invention is to provide an automatic flush actuation apparatus, which provides an economic and efficient solution for incorporating with the conventional manual operated flushing system in a simple and economical way.

Accordingly, in order to accomplish the above objects, the present invention provides an automatic flush actuation apparatus for a flushing system which comprises a valve body having a water inlet, a water outlet and a water chamber communicating therebetween, a valve seat, having a flush channel, normally sealed with the water chamber and disposed between the water inlet and the water outlet for retaining a predetermined water pressure within the water chamber so as to block water flowing from the water inlet to the water outlet, and a flush lever coupled with the valve body, wherein the flush valve comprises:

a valve member adapted for being disposed at the valve seat to control the water flowing from the water inlet to the water outlet, wherein the valve member is capable of being moved by the flush lever between a manual-operated closed position and a manual-operated opened position, wherein at the manual-operated closed position, the valve member is arranged for sealedly sitting at the valve seat to block the water from passing through the water outlet, and at the manual-operated opened position, the valve member is moved to an opened position for releasing the water pressure within the water chamber to allow the water to pass from the water inlet to the water outlet through the water chamber; and a sensor-operated powering assembly, comprising:

a housing, which is adapted for mounting on the valve body; a replaceable power source received in the housing; a CPU electrically connected with the power source for sensing a presence of a user of the flushing system, so as to active the power generator; a power generator electrically connected to the CPU; a relief valve provided at the valve member for controlling the water flowing from the water inlet to the water outlet through the water chamber; and an actuator driven by the power generator to move the relief valve between an auto-operated closed position and an auto-operated opened position, wherein at the auto-operated closed position, the relief valve is sealedly closed for blocking the water passing to the water outlet, and at the auto-operated opened position, the relief valve is moved to an opened position by the actuator for releasing the water pressure within the water chamber to allow the water passing to the water outlet.

These and other objectives, features, and advantages of the present invention will become apparent from the following detailed description, the accompanying drawings, and the appended claims.

DETAILED DESCRIPTION OF THE PREFERRED EMBODIMENT

Figure 1:
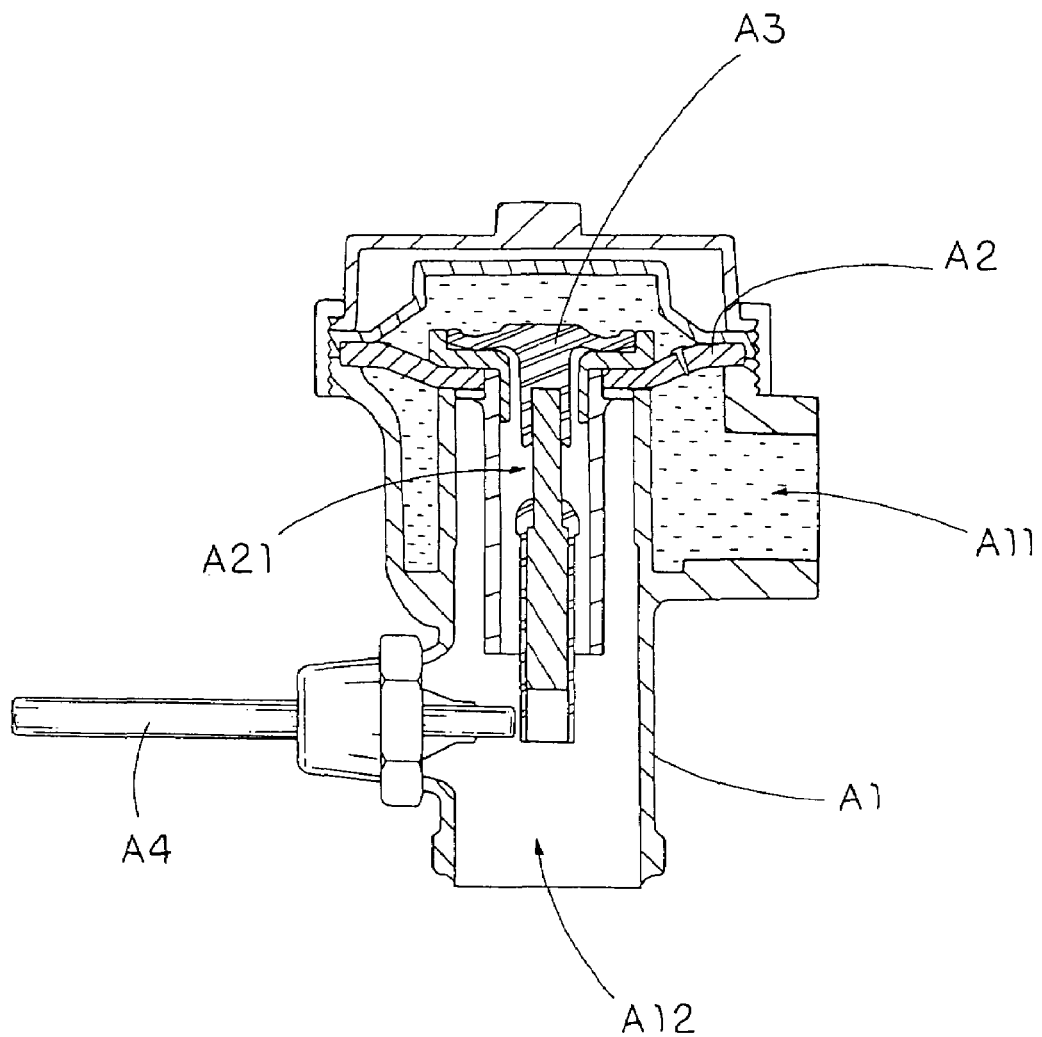
FIG. 1 is a sectional view of a conventional manual operated flushing system.
Figure 2:
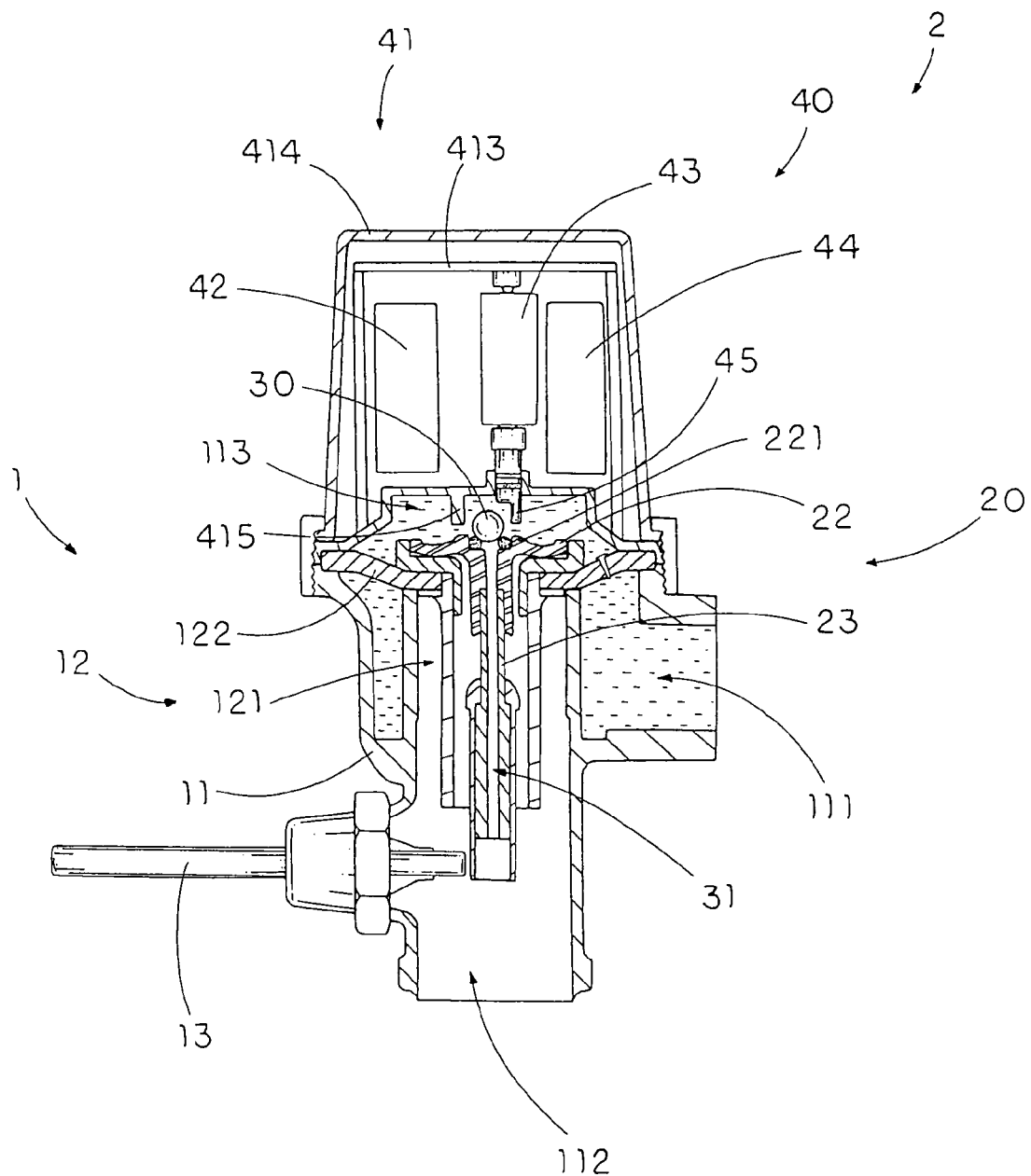
FIG. 2 is a sectional view of an automatic flush actuation apparatus according to a preferred embodiment of the present invention.

Referring to FIG. 2 of the drawings, an automatic flush actuation apparatus 2 for a flushing system 1 according to a preferred embodiment of the present invention is illustrated, wherein the automatic flush actuation apparatus 2 is capable of incorporating with a conventional manual operated flushing system to achieve both manual and automatic operations to start a flushing cycle of the flushing system 1.

The flushing system 1, such as the conventional manual operated flushing system, comprises a valve body 11 having a water inlet 111, a water outlet 112 and a water chamber 113 that is normally sealed between the water inlet 111 and the water outlet 112, a valve seat 12, having a flush channel 121, disposed between the water inlet 111 and the water outlet 112 to block water flowing from the water inlet 111 to the water outlet 112, and a flush lever 13 coupled with the valve body 11.

The valve seat 12 comprises a diaphragm 122, having a bleed hole 100, sealedly disposed in the valve body 11 in a movable manner to define the water chamber 113 above the diaphragm 122 to communicate between the water inlet 111 and the water outlet 112. In other words, once the water within the water chamber 113 is released to reduce the water pressure therein, the diaphragm 122 is forced to bend upwardly so that the water is capable of passing from the water inlet 111 to the water outlet 112 to complete the flushing cycle of the flushing system.

Accordingly, the water is flowed into the water chamber 113 from the water inlet 111 through the bleed hole 100 on the diaphragm 122 in such a manner that the water within the water chamber 113 provides a predetermined water pressure against the diaphragm 122 to normally block the water flowing to the water outlet 112.

The automatic flush actuation apparatus 2 comprises a valve member 20 and a sensor-operated powering assembly 40.

The valve member 20 is adapted for being disposed at the valve seat 12 to control the water flowing from the water inlet 111 to the water outlet 112. The valve member 20 is capable of being moved by the flush lever 13 between a manual-operated closed position and a manual-operated opened position, wherein at the manual-operated closed position, the valve member 20 is arranged for sealedly sitting at the valve seat 12 to block the water passing to the water outlet 112, and at the manual-operated opened position, the valve member 20 is moved to an opened position for releasing the water pressure within the water chamber 113 through the flush channel 121 so as to allow the water passing from the water inlet 111 to the water outlet 112.

Figure 5:
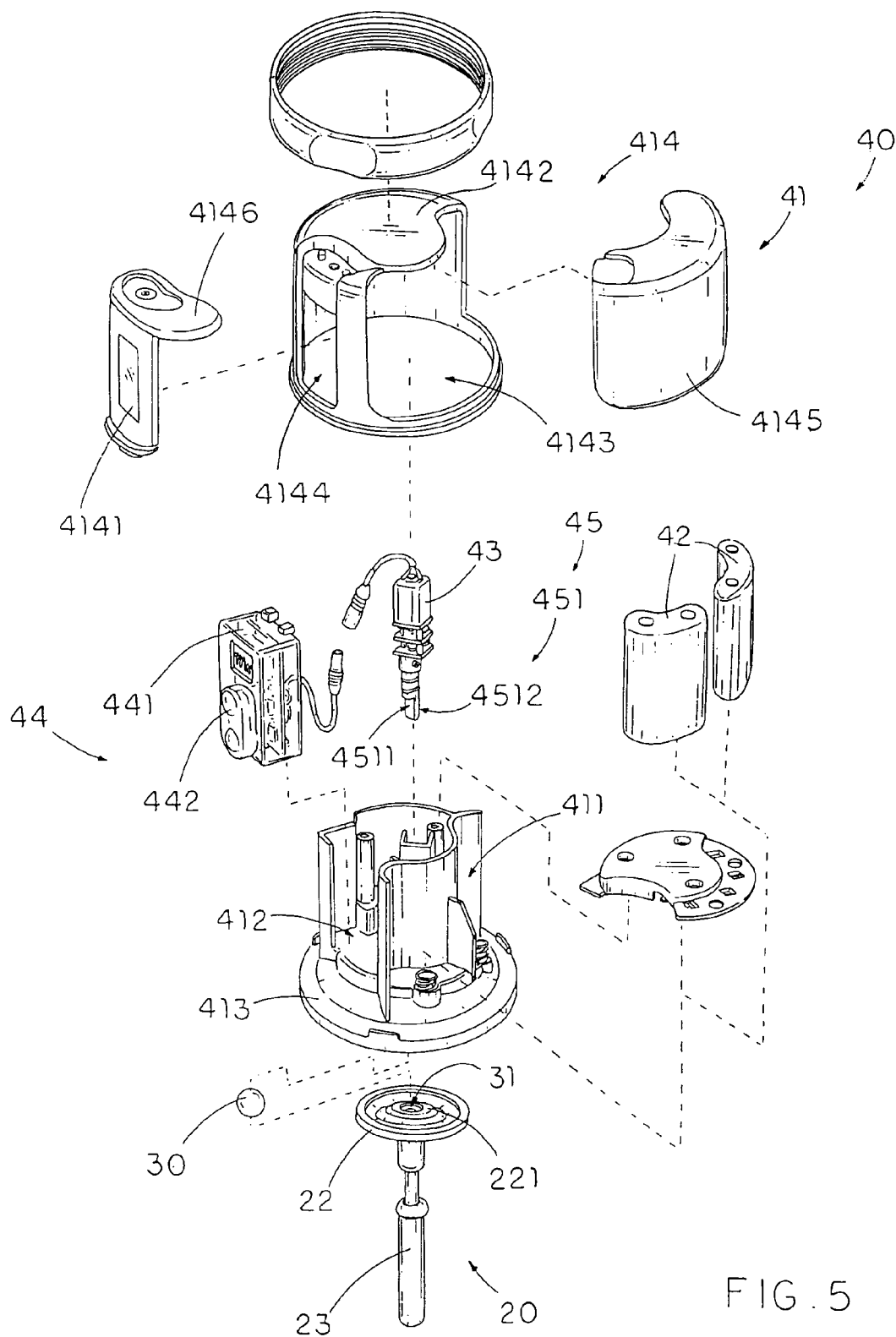
FIG. 5 is an exploded perspective view of a sensor-operated powering device of the automatic flush actuation apparatus according to the above preferred embodiment of the present invention.

As shown in FIGS. 2 and 5, the sensor-operated powering assembly 40 comprises a housing 41, which is adapted for mounting on the valve body 11, having a power source compartment 411 and a CPU cavity 412, a power source 42 replaceably received in the power source compartment 411, a power generator 43 electrically connected to the CPU 44, and the CPU 44 which is received in the CPU cavity 412 of the housing 41, electrically connected with the power source 42 for sensing a presence of a user of the flushing system 1, so as to active the power generator 43.

The sensor-operated powering assembly 40 further comprises a relief valve 30 provided at the valve member 20 for controlling the water flowing from the water inlet 111 to the water outlet 112 through the water chamber 113 and an actuator 45 driven by the power generator 43 to move the valve stopper 32 between an auto-operated closed position and an auto-operated opened position.

Accordingly, at the auto-operated closed position, the relief valve 30 is sealedly closed for blocking the water passing to the water outlet 112, and at the auto-operated opened position, the relief valve 30 is moved to an opened position by the actuator 45 for releasing the water pressure within the water chamber 113 to allow the water passing to the water outlet 112.

According to the preferred embodiment, the valve member 20 comprises a sealing platform 22 arranged for sealedly supporting on the diaphragm 122 of the valve seat 12 to normally close the flush channel 121 and a valve controlling shaft 23 downwardly extended from the sealing platform 22 for communicating with the flush lever 13 within the flush channel 121.

Figure 3A:
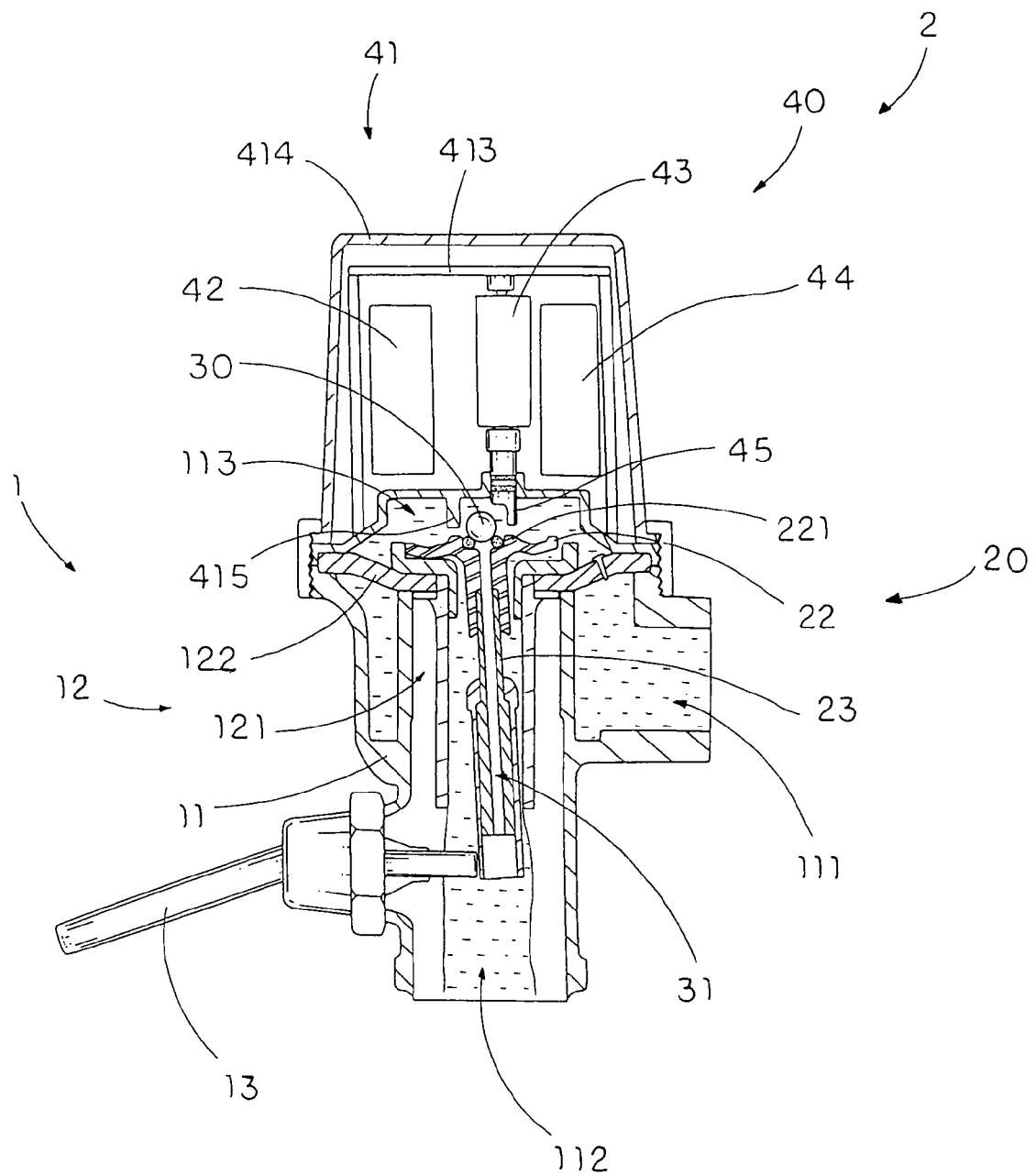
FIGS. 3A and 3B illustrate a manual operation of the flushing cycle for the automatic flush actuation apparatus according to the above preferred embodiment of the present invention.
Figure 3B:
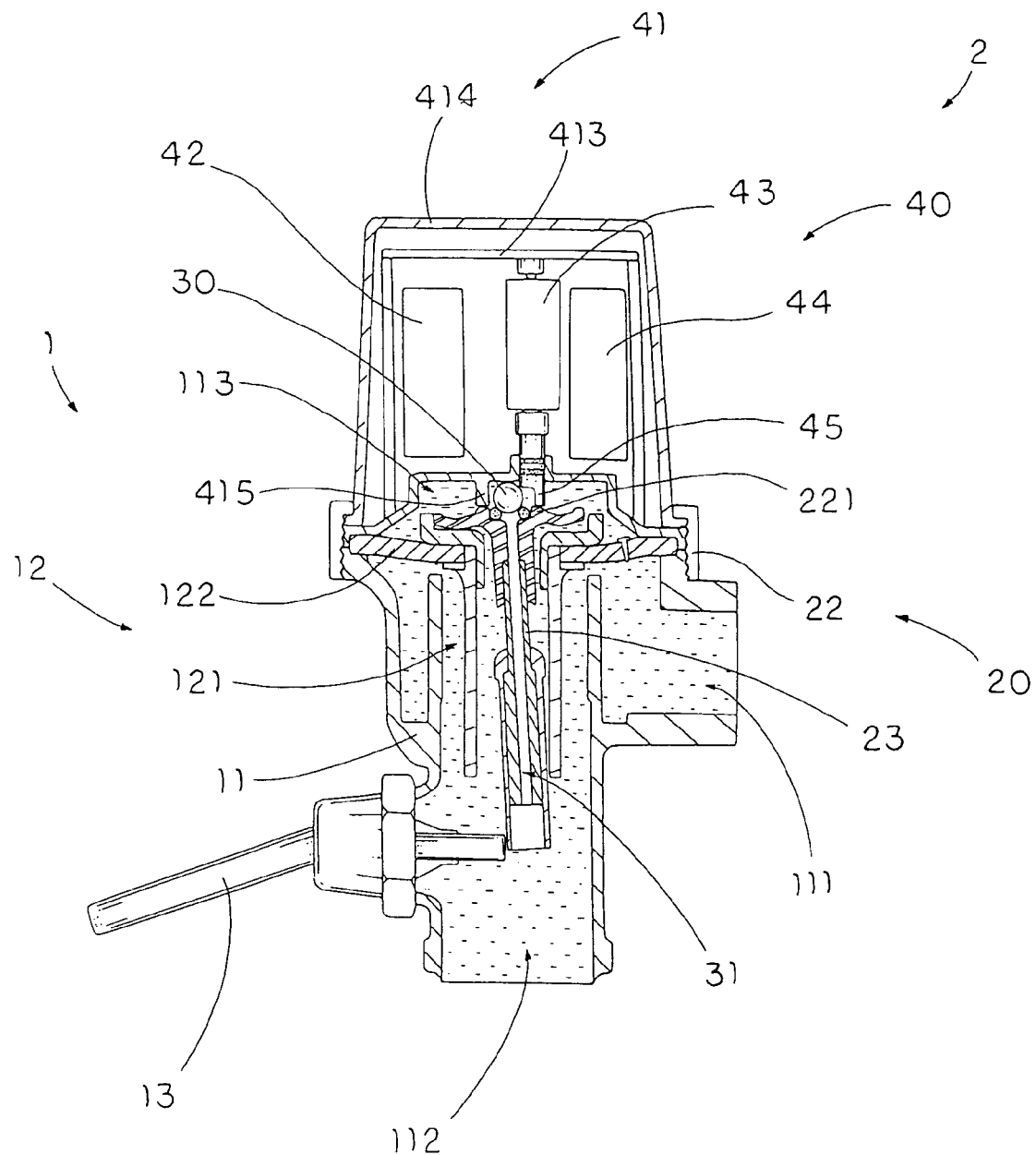

As shown in FIG. 3A, by actuating the flush lever 13, the valve controlling shaft 23 is pushed to drive the sealing platform 22 at a position offset with respect to the diaphragm 122 such that the water within the water chamber 113 is allowed to flow out through the flush channel 121 and release the water pressure within the water chamber 113 because the amount of water flowing out through the flush channel 121 is much larger than the amount of water flowing in through the bleed hole 100. Thus, when the water pressure within the water chamber 113 reduces, the diaphragm 122 is pushed upwardly for allowing the water passing to the water outlet 112, so as to start the flushing cycle of the flushing system 1 manually as the conventional manual-operated flushing system, as shown in FIG. 3B.

Once the flush lever 13 is returned back to its original position, the sealing platform 22 is forced to sealedly sit on the diaphragm 122 due to the water pressure so as to sealedly close the flush channel 121. Therefore, the diaphragm 122 is dropped down by refilling the water back into the water chamber 113 to increase the water pressure therein so as to sealedly close the water outlet 112 to stop the water passing thereto. It is worth to mention that since the sealing platform 22 is normally sealed on the diaphragm 122, no water is allowed to flow through the flush channel 121 to the water outlet 112 until the flushing cycle is started.

The relief valve 30 has a water passage 31 axially extended along the valve member 20 for communicating the water chamber 113 with the water outlet 112, and a valve stopper 32 disposed on the valve member 20 to normally close the water passage 31 for controlling the water flowing from the water inlet 111 to the water outlet 112.

As shown in FIG. 2, the water passage 31 is coaxially extended from the sealing platform 22 to a bottom end of the valve controlling shaft 23 for communicating the water chamber 113 with the water outlet 112.

The valve stopper 32, having a ball-shape, sits on the sealing platform 22 at an opening of the water passage 31 to normally close the water passage 31 for blocking the water pressure releasing from the water chamber 113. Accordingly, the sealing platform 22 has a circular retaining seat 221 protruding upwardly around the opening of the water passage 31 wherein the valve stopper 32 is disposed at the retaining seat 221 of the valve member 20 so as to hold the valve stopper 32 in position. It is worth to mention that when the valve member 20 is moved between the manual-operated closed position and the manual-operated opened position, the valve stopper 32 remains at the opening of the water passage 31 to block the water passing the water outlet 112.

As shown in FIG. 5, the housing 41 comprises a supporting frame 413 supported above the valve stopper 32 and a valve cap 414, having a transparent window 4141, adapted for detachably mounting on the valve body 11 to protectively enclose the supporting frame 413, wherein the power source 42, the power generator 43, and the CPU 44 are supported by the supporting frame 413 and enclosed by the valve cap 414 while the CPU 44 is capable of communicating with outside through the transparent window 4141.

According to the preferred embodiment, the power source 42 comprises a battery replaceably disposed in the power source compartment 411 to electrically connect with the CPU 44. It is worth to mention that the power source 42 can be used as an AC current to electrically plug into an electric outlet for supplying electricity to the CPU 44.

The power generator 43, according to the preferred embodiment, is an electric motor electrically connected to the CPU 44 wherein the power generator 43 is actuated via the CPU 44 to drive the actuator 45 to rotate. Accordingly, the power generator 43 can be a conventional solenoid electrically connected to the CPU 44 to drive the actuator 45 so as to move the valve stopper 32 between the auto-operated closed position and the auto-operated opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention.

The CPU 44 comprises a control processor 441 supported in the housing 41 and a sensor 442 which is electrically connected to the control processor 441 and aligned with the transparent window 4141 of the valve cap 414. Accordingly, the sensor 442 is an infrared sensor arranged to detect the presence of the user by means of infrared signal in such a manner that when the sensor 442 sends an infrared signal through the transparent window 4141 for detecting the presence of the user of the flushing system, the control processor 441 is activates the power generator 43 to actuate valve stopper 32 to open the relief valve 30.

In addition, the control processor 441 is a control circuitry to control the configuration of the flushing cycle wherein the control processor 441 is adapted to control the time of the flushing cycle, the water volume for each flushing cycle, the detecting range of the sensor 442, and the motion of the electric motor of the power generator 43. Thus, a default configuration is preset in the control processor 441 such that the automatic flush actuation apparatus of the present invention is capable of returning to its original settings through the control processor 441. It is worth to mention that the control processor 441 also controls the power of the power source 42 wherein when there is no sufficient power to actuate the power generator 43, the control processor 441 will control the relief valve 30 to remain in the closed position. In other words, only the manual operation of the flush lever 13 is capable of starting the flushing cycle when the control processor 441 stops the actuation of the relief valve 30.

The actuator 45 is rotatably extended from the power generator 43 wherein the actuator 45 has a driving end portion 451 downwardly and rotatably extended from a bottom side of the supporting frame 413 to contact with the valve stopper 32. Accordingly, the driving end portion 451 of the actuator 45, having a semi-circular cross section, has a flat contacting surface 4511 and a curved contacting surface 4512, wherein the driving end portion 451 of the actuator 45 is arranged to be driven to rotate via the power generator 43 to move the valve stopper 32 at the auto-operated closed position that the valve stopper 32 is contacted with the flat contacting surface 4511 of the actuator 45 to retain the valve stopper 32 at the opening of the water passage 31 for blocking the water passing to the water outlet 112 as shown in FIG. 2, and to move the valve stopper 32 at the auto-operated opened position that the valve stopper 32 is contacted with the curved contacting surface 4512 of the actuator 45 to move the valve stopper 32 to offset the opening of the water passage 31 for allowing the water passing to the water outlet, as shown in FIG. 4A.

Figure 4A:
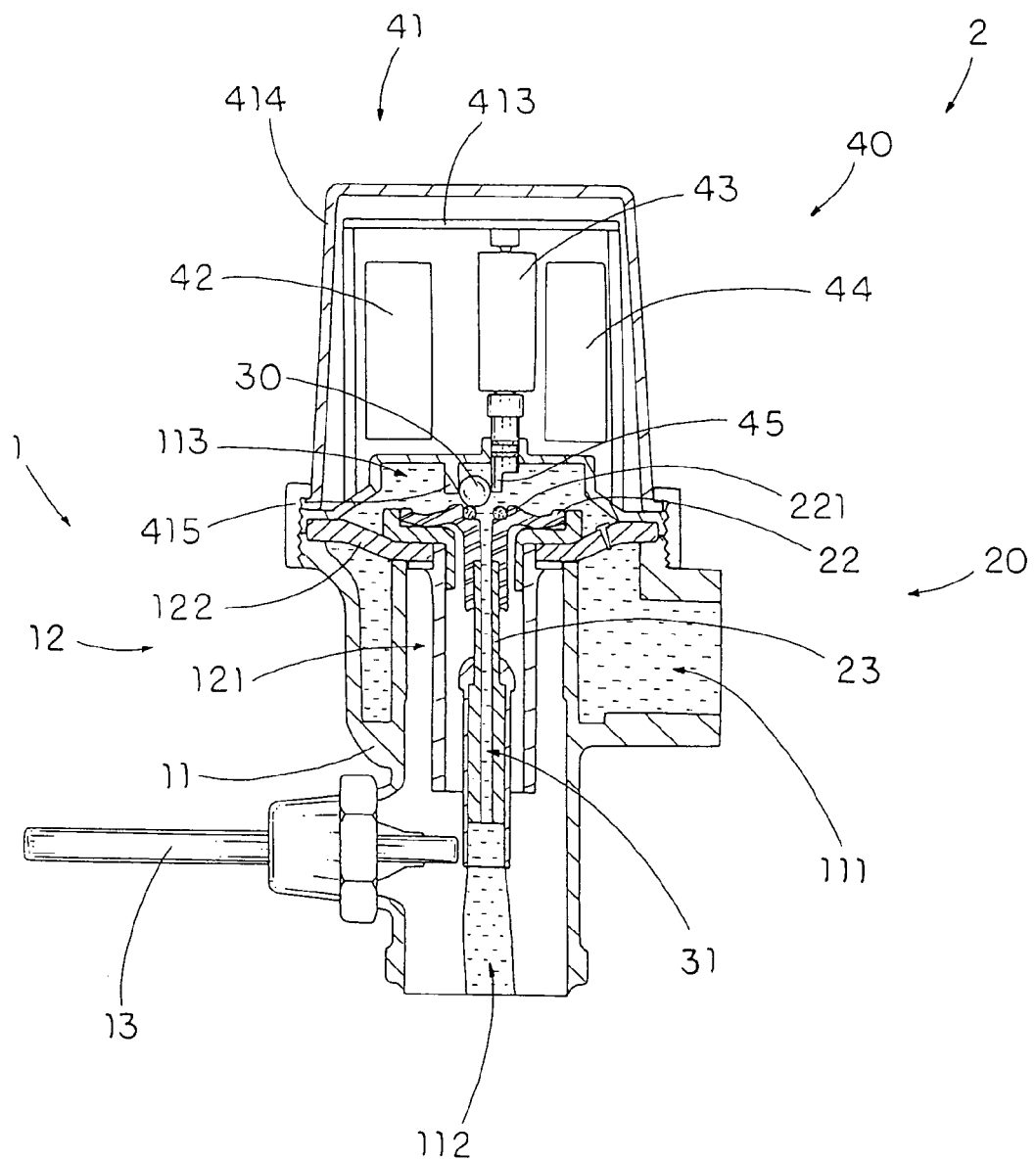
FIGS. 4A and 4B illustrate an automatic sensor operation of the flushing cycle for the automatic flush actuation apparatus according to the above preferred embodiment of the present invention.
Figure 4B:
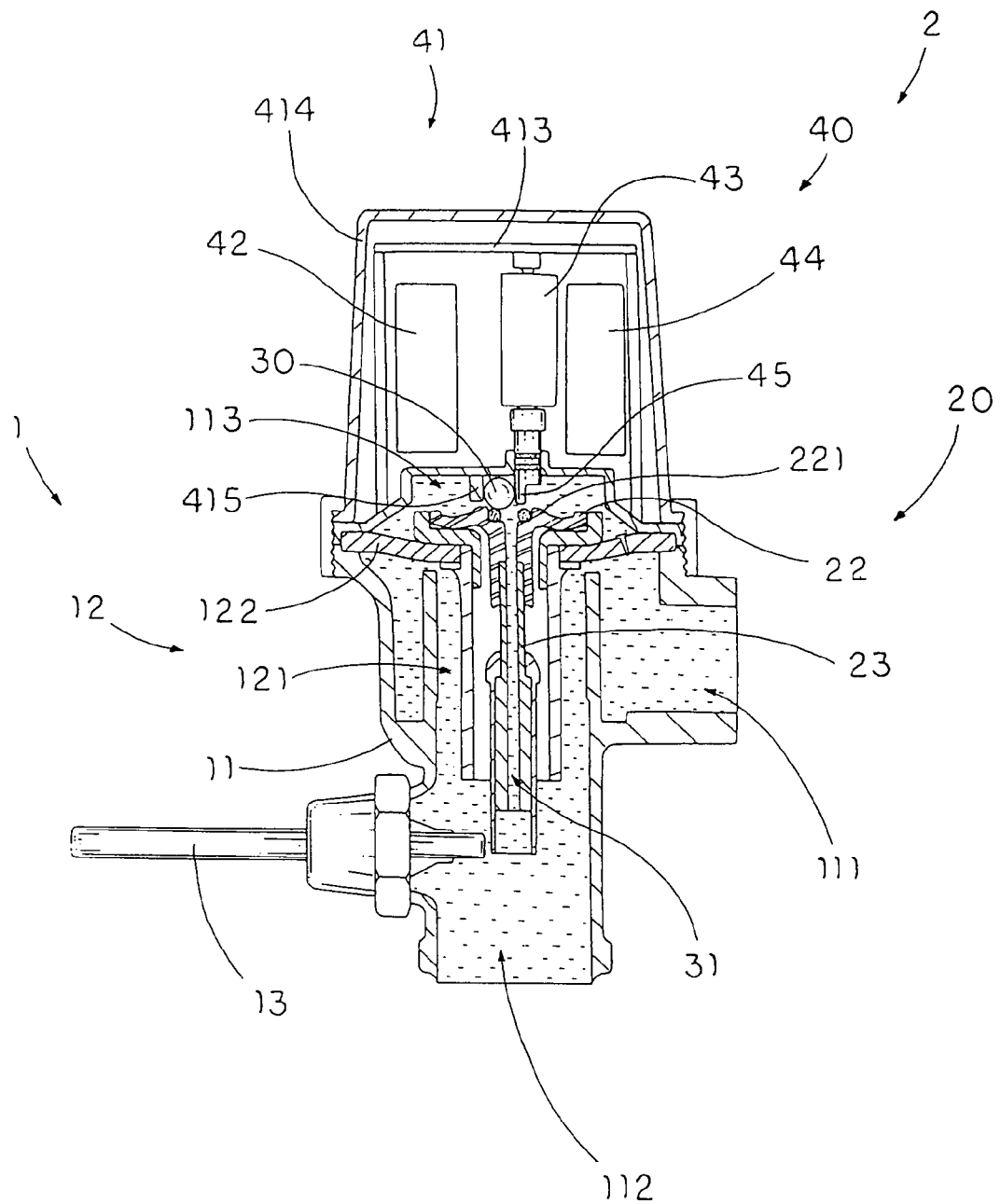

It is worth to mention that when the actuator 45 moves the valve stopper 32 away from the opening of the water passage 31, the water within the water chamber 113 is allowed to flow out through the water passage 31 so as to reduce the water pressure within the water chamber 113, as shown in FIG. 4A. Then, the diaphragm 122 is pushed upwardly for allowing the water flowing from the water inlet 111 to the water outlet 112, as shown in FIG. 4B. Once the valve stopper 32 is moved back into its original position to close the water passage 31, the diaphragm 122 is dropped down by refilling the water back into the water chamber 113 to increase the water pressure therein so as to sealedly close the water outlet 112 to stop the water passing thereto.

The sensor-operated flushing cycle of the flushing system 1 is controlled by the rotation of the actuator 45. Once the driving end portion 451 of the actuator 45 is rotated back to its original position, i.e. valve stopper 32 is contacted with the flat contacting surface 4511 of the actuator 45, the valve stopper 32 is forced to sealedly sit on the valve member 20 by means of water pressure to close the water passage 31. Therefore, the diaphragm 122 is dropped down by pressure to sealedly close the water outlet 112 to stop the water passing thereto.

It is worth to mention that the volume of water used in one flushing cycle for the flushing system 1 can be controlled by the power generator 43 through the CPU 44 to control the rotational speed of the actuator 45. The volume of water used in each flushing cycle can be adjustably controlled by controlling the rotational cycle of the actuator 45, i.e. how long the actuator 45 drives the valve stopper 32 to stay in the opened position and the closed position. In other words, the water volume of each flushing cycle will be increased when the CPU 44 delays the rotational cycling time of the actuator 45.

Accordingly, when the valve stopper 32 is moved between the auto-operated closed position and the auto-operated opened position, the valve member 20 is remained at its manual-operated closed position. Since the manual operation and the sensor operation employ with different water pathways, i.e. the flush channel 121 and the water passage 31, the manual and sensor operations do not interrupt with each other and function individually.

Therefore, to start the flushing cycle of the flushing system, the individual is able to either manually operate the flush lever 13 to move the valve member 20 to an offset position so as to release the water pressure through the flush channel 121 or automatically operate the CPU 44 to move the valve stopper 32 to an offset position so that the water pressure is allowed to be released through the water passage 31. In other words, even though the sensor-operated powering assembly 40 fails to operate due to the battery, the individual is still able to complete the flushing cycle for the flushing system manually.

In order to securely hold the valve stopper 32 in position, the supporting frame 413 of the housing 41 further comprises a locating ring 415 integrally and downwardly protruded from the bottom side of the supporting frame 413 to coaxially align with the water passage 31 so as to form as a boundary for the valve stopper 32 to move within the locating ring 415. In other words, the locating ring 415 limits the movement of the valve stopper 32 to prevent the valve stopper 32 from becoming dislocated on the valve member 20 and to guide the valve stopper 32 returning back to the opening of the water passage 31 after completing the flushing cycle.

As shown in FIG. 5, the valve cap 414 further comprises an outer casing 4142 having a power source opening 4143 aligned with the power source compartment 411 to expose the power source 42 to outside through the power source opening 4143 and a CPU opening 4144 aligned with the CPU cavity 412 to expose the CPU 44 to outside through the CPU opening 4144, and a power source cover 4145 detachably mounted on the outer casing 4142 to cover the power source opening 4143, wherein the transparent window 4141 is detachably mounted on the outer casing 4142 to enclose the CPU 44 within the valve cap 414.

Therefore, an individual is able to replace the power source 42 and to adjust the settings of the CPU 44 by detaching the power source cover 4145 and the transparent window 4141 respectively without removing the entire valve cap 414 so as to simplify the replacement operation and adjustment of the present invention. It is worth to mention the valve cap 414, such as the conventional cap, is securely mounted on the valve body 11 via a locking ring 400 such that the individual must use a wrench to unscrew the locking ring 400 in order to detach the valve cap 414. It is worth to mention that the locking ring 400 is arranged to sealedly mount the diaphragm 122 of the valve seat 12 on the valve body 11 to prevent water leakage thereof. However, it would be inconvenient to replace the power source 42 and to adjust the CPU 44 if the valve cap 414 must be detached from the valve body 11 and then sealedly attached back onto the valve body 11. Thus, the water may leak to the outside when the valve cap 414 is opened, especially if the valve cap 414 is not perfectly sealed onto the valve body 11.

In addition, the valve cap 414 further comprises a cover locker 4146 provided on the outer casing 4142 to securely lock up the power source cover 4145 and the transparent window 4141 to enclose the power source opening 4143 and the CPU opening 4144 respectively. It is worth to mention that the locking and unlocking operation of the cover locker 4146 is simply in comparison with the locking and unlocking operation of the valve cap 414, so as to provide a quick and easy replacement operation of the present invention.

In comparison with the conventional manual operated flushing system, the conventional manual operated flushing system can keep most of the major components, such as the valve body 11, valve seat 12 and the flush lever 13, in order to incorporate with the automatic flush actuation apparatus 2 of the present invention, so as to minimize the cost of incorporating the conventional manual operated flushing system with the automatic flush actuation apparatus 2 of the present invention.

Figure 6:
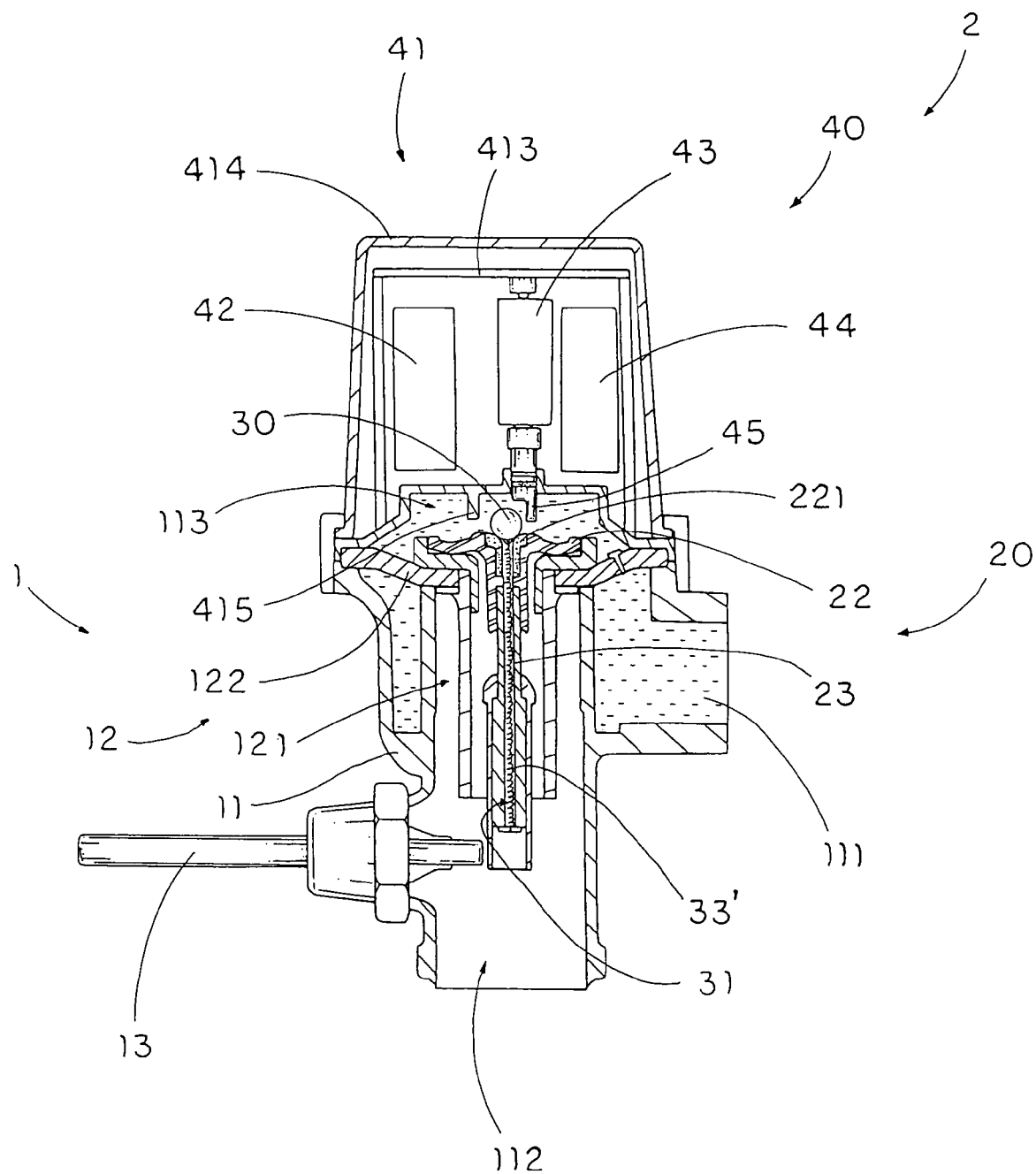
FIG. 6 illustrates an alternative mode of the relief valve of the automatic flush actuation apparatus according to the above preferred embodiment of the present invention.

FIG. 6 illustrates an alternative mode of the relief valve 30 wherein the relief valve 30 further comprises a resilient element 33' having a biasing end biasing against the valve stopper 32 so as to normally retain the valve stopper 32 at the auto-operated closed position. The resilient element 33', according to the preferred embodiment, is a compression spring disposed within the water passage 31 for applying an urging force against the valve stopper 32 so as to normally pull the valve stopper 32 to sealedly close the opening of the water passage 31. As shown in FIG. 6, the biasing end of the resilient element 33' coupled with the valve stopper 32 and an opposed affixing end coupled with a bottom end of the water passage 31 for applying the pulling force against the valve stopper 32.

Figure 7A:
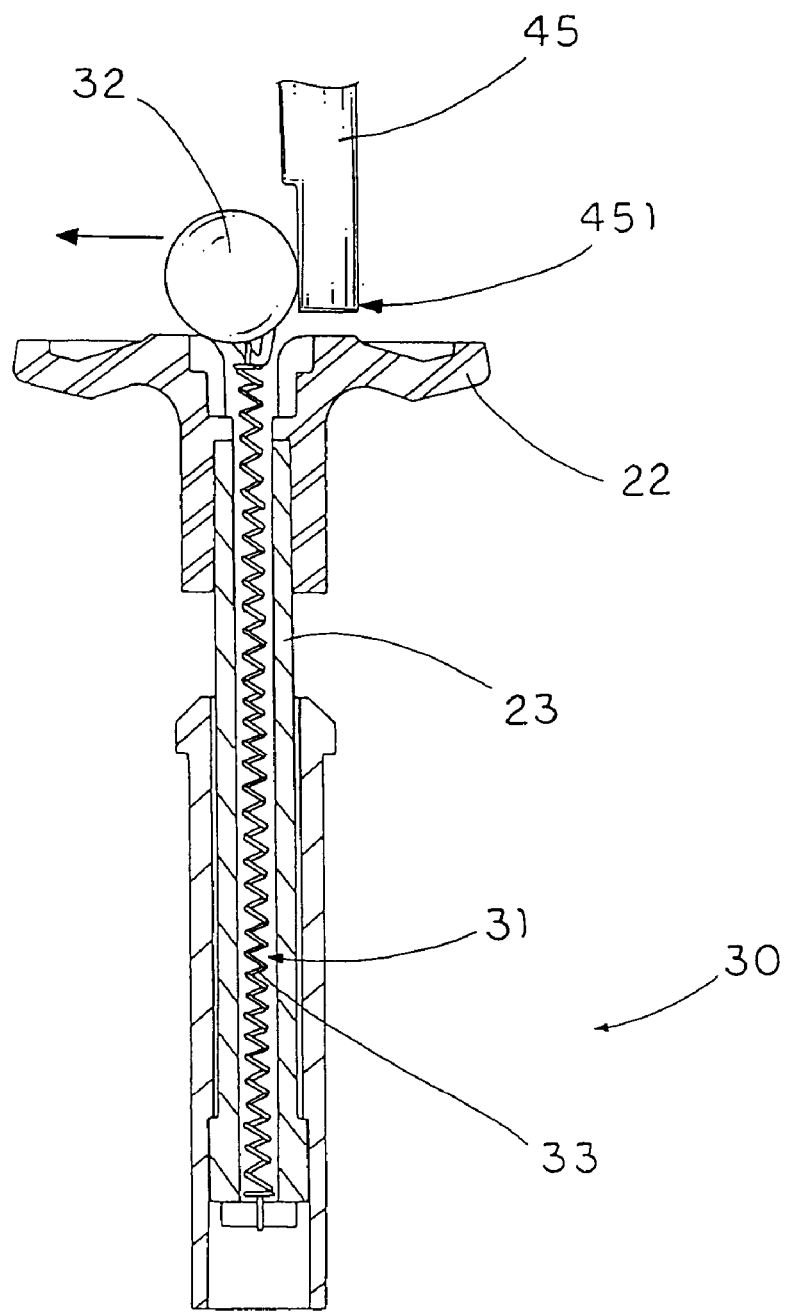
FIGS. 7A and 7B illustrate the operation of the relief valve of the alternative mode according to the above preferred embodiment of the present invention.
Figure 7B:
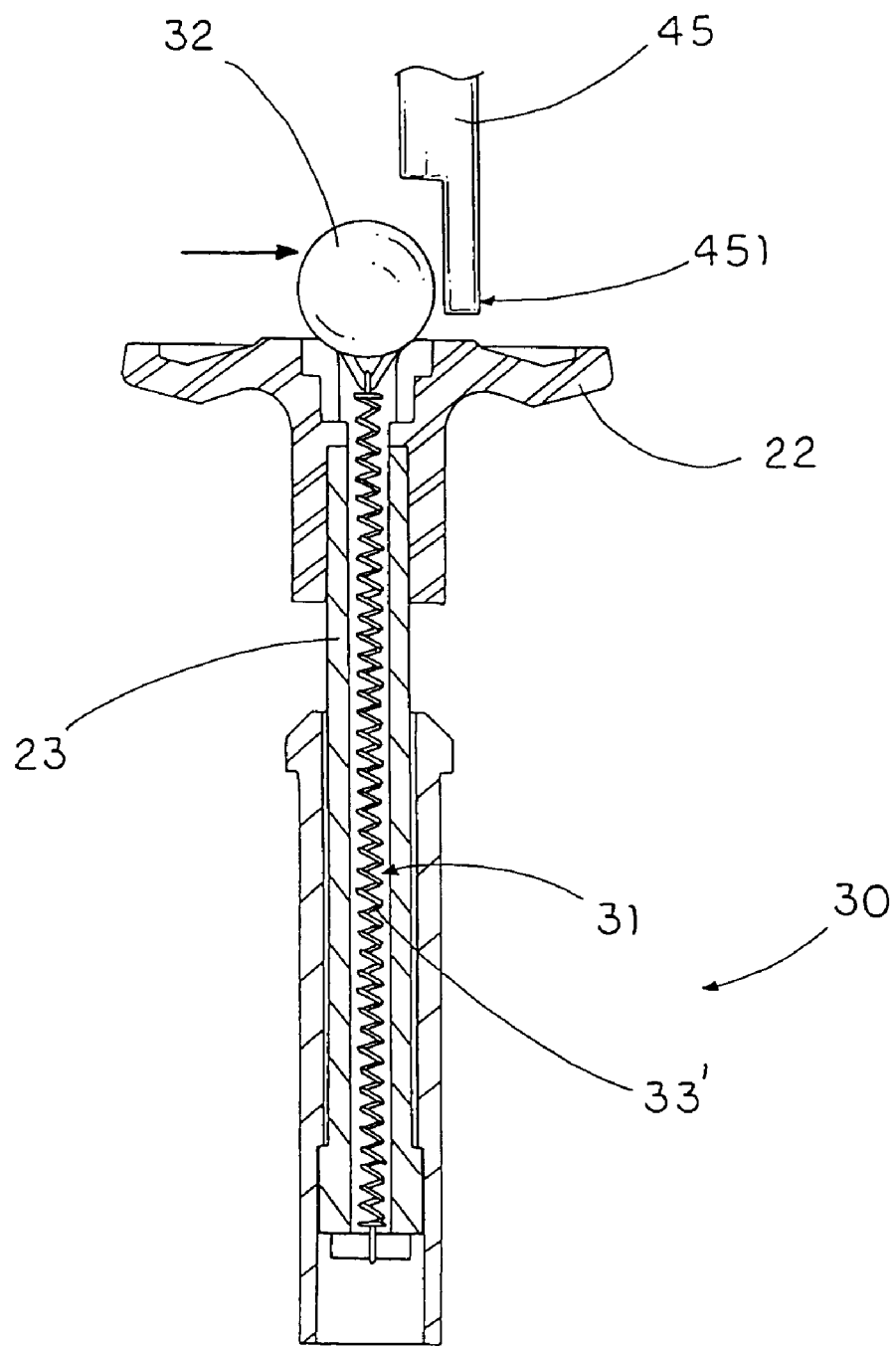

As shown in FIG. 7A, when the driving end portion 451 of the actuator 45 is driven to rotate to move the valve stopper 32 to the offset position so as to allow the water to flow through the water passage 31, the resilient element 33' is forced to stretch for applying the urging pressure against the valve stopper 32. After the driving end portion 451 of the actuator 45 moves back to its original position, the resilient element 33 rebounds to its original form to pull the valve stopper 32 back on the retaining seat 221 of the sealing platform 22 for sealing the water passage 31 so as to block the water to flow therethrough, as shown in FIG. 7B. Therefore, the resilient element 33' ensures the valve stopper 32 of the relief valve 30 returning back to the auto-operated closed position after each flushing operating.

In addition, the automatic flush actuation apparatus 2 of the present invention is capable of incorporating with most conventional flushing systems to provide the sensor operation of the flushing system with or without the flush lever 13 for starting the flushing cycle. It is worth to mention that the valve member 20 can be embodied as the valve seat 12 when the automatic flush actuation apparatus 2 of the present invention is incorporated with the conventional sensor-operation flushing system.

Figure 8:
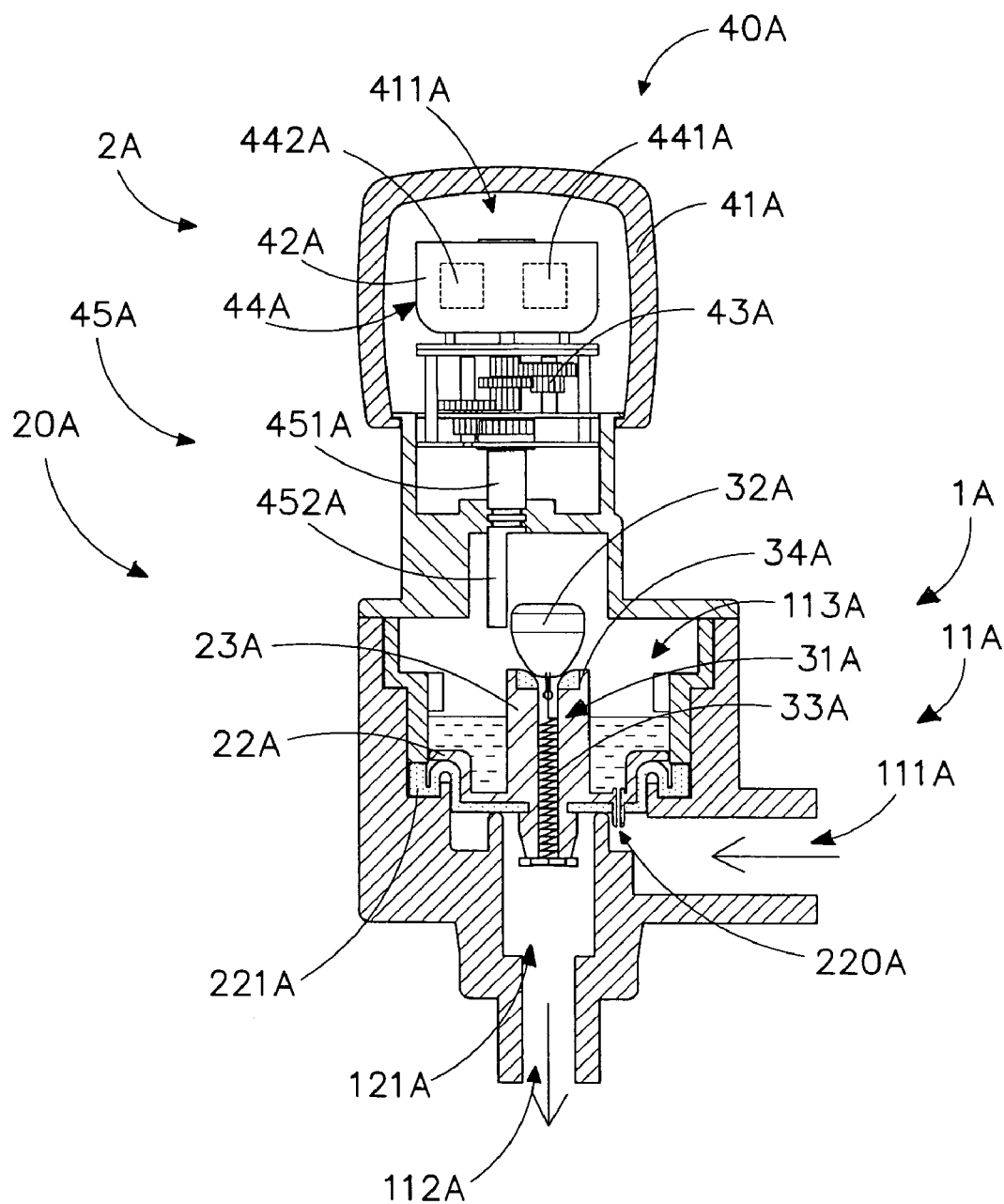
FIG. 8 is a sectional view of an automatic flush actuation apparatus according to a second preferred embodiment of the present invention.

As shown in FIG. 8, an automatic flush actuation apparatus 2A according to a second preferred embodiment of the present invention is illustrated, wherein the automatic flush actuation apparatus 2A is capable of incorporating with a conventional water system 1A to achieve automatic operation thereof.

The water flushing system 1A, such as the toilet system or the flushing system, comprises a valve body 11A having a water inlet 111A, a water outlet 112A, and a water chamber 113A communicating between the water inlet 111A and the water outlet 112A, wherein a flush channel 121A is formed at the water outlet 112A.

The automatic flush actuation apparatus 2A comprises a valve member 20A and a sensor-operated powering assembly 40A.

The valve member 20A is adapted for being disposed within the water chamber 113A for controlling water passing from the water inlet 111A to the water outlet 112A wherein the valve member 20A is adapted for being moved for allowing the water passing to the water outlet 112A.

The valve member 20A comprises a sealing platform 22A arranged for sealing at the water outlet 112A so as to normally close the water outlet 112A, and a valve controlling shaft 23A coaxially extended from the sealing platform 22A.

Accordingly, the sealing platform 22A has a bleed hole 220A and comprises a sealing diaphragm 221A movably sealed at the water outlet 112A arranged in such a manner that when the water pressure within the air chamber 113A is different from the water pressure at the water outlet 113A, the sealing diaphragm 221A is lifted to unseal the water outlet 112A for allowing the water passing to the water outlet 112A. The bleed hole 220A is arranged for communicating the water chamber 113A with the water inlet 111A. In other words, when the water pressure at the water chamber 113A is reduced, the sealing diaphragm 221A is automatically popped up to release the water from the water inlet 111A to the water outlet 112A through the flush channel 121A.

The sensor-operated powering assembly 40A comprises a housing 41A, which is adapted for mounting on the valve body 11A, having a power source compartment 411A, a power source 42A replaceably received in the power source compartment 411A, a power generator 43A, and a CPU 44A electrically connected to the power source 42A and the power generator 43A for sensing a presence of a user, so as to activate the power generator 43A.

The sensor-operated powering assembly 40A further comprises a relief valve 30A provided at the valve member 20A for controlling the water pressure within the air chamber 113A so as to control the water flowing from the water inlet 111A to the water outlet 112A through the water chamber 113A. The relief valve 30A has a water flushing passage 31A extended along the valve member 20A to communicate the water chamber 113A with the water outlet 112A, and comprises a valve stopper 32A and a retaining element 33A normally retaining the valve stopper 32A on the valve member 20A to close the water flushing passage 31A for balancing the water pressure within the air chamber 113A so as to control the water flowing from the water inlet 111A to the water outlet 112A through the flush channel 121A.

Figure 9:
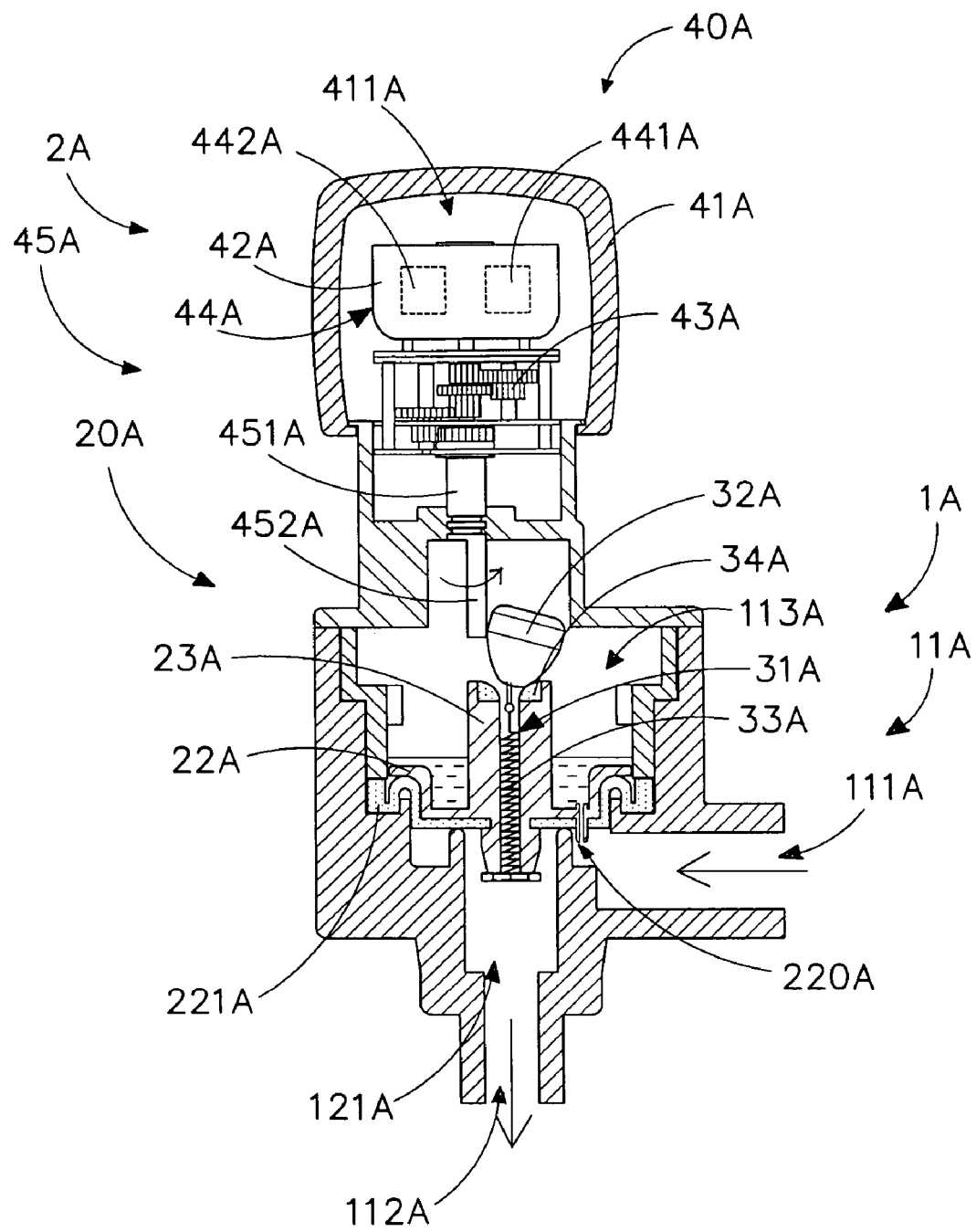
FIG. 9 is a sectional view of the automatic flush actuation apparatus according to the above second preferred embodiment of the present invention, illustrating the automatic operation of the automatic flush actuation apparatus when releasing water pressure within the water chamber.
Figure 10:
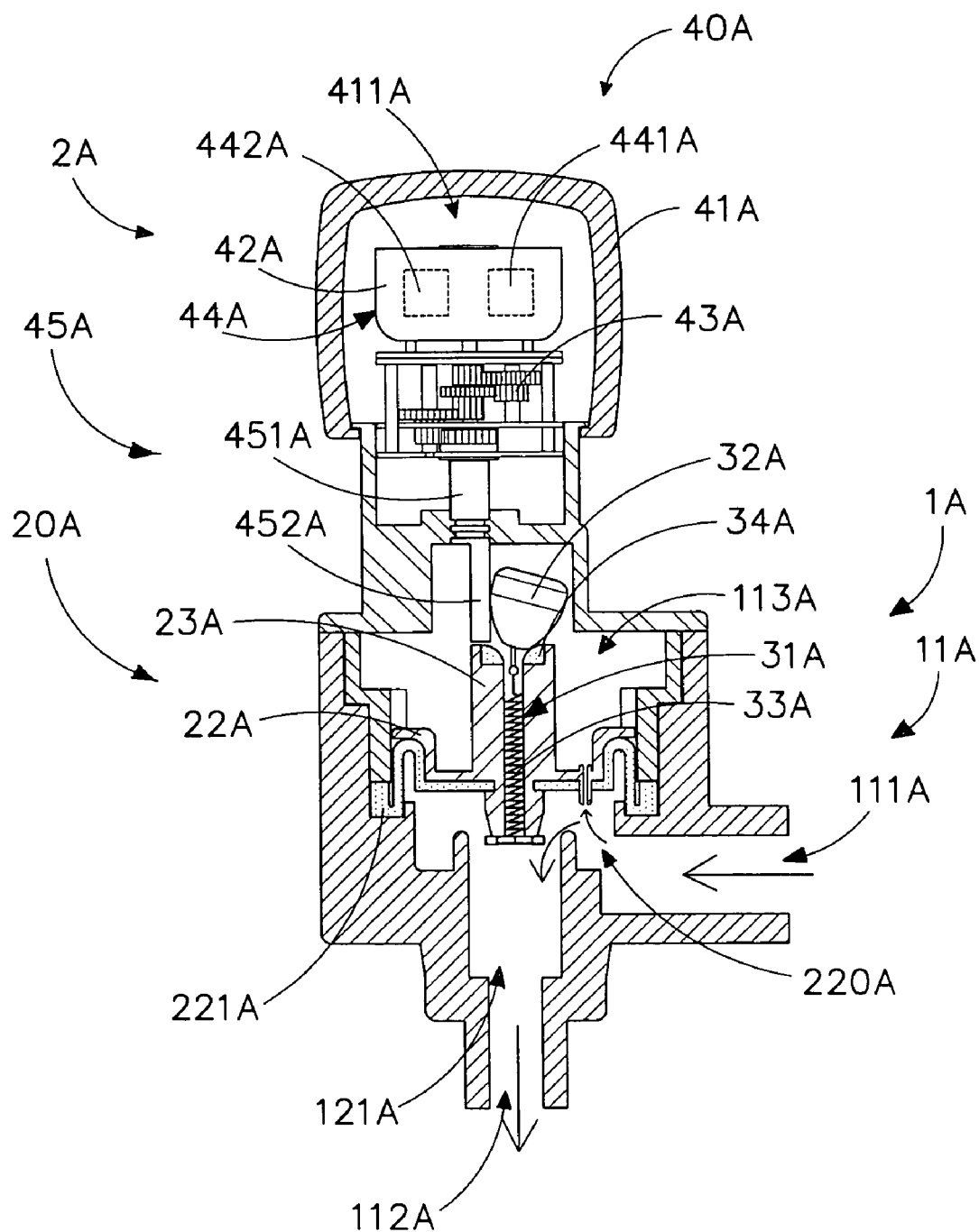
FIG. 10 is a sectional view of the automatic flush actuation apparatus according to the above second preferred embodiment of the present invention, illustrating the automatic operation of the automatic flush actuation apparatus when lifting up the valve member.

The sensor-operated powering assembly 40A further comprises an actuator 45A driven by the power generator 43A to move the valve stopper 32A between an auto-operated closed position and an auto-operated opened position. In which, at the auto-operated closed position, the valve stopper 32A is sealed retained to close the water flushing passage 31A for blocking the water passing to the water outlet 112A as shown in FIG. 8, and at the auto-operated opened position, the valve stopper 32A is moved to an opened position by the actuator 45A for allowing the water passing to the water outlet 112A, as shown in FIGS. 9 and 10.

As shown in FIG. 8, the water flushing passage 31A is coaxially extended along the valve controlling shaft 23A wherein the valve stopper 32A is movably sat on the sealing platform 22A at a top opening of the water flushing passage 31A so as to seal the water flushing passage 31A.

The relief valve 30A further comprises a sealing ring 34A mounted on the sealing platform 22A of the valve member 20A around the top opening of the water flushing passage 31A such that the valve stopper 32A is sat on the sealing ring 34A to seal the water flushing passage 31A so as to block the water flushing into the water flushing passage 31A.

The retaining element 33A comprises a resilient element coupling with the valve stopper 32A for applying an urging force against the valve stopper 32A so as to retain the valve stopper 32A at the auto-operated closed position. According to the preferred embodiment, the resilient element of the retaining element 33A is a compression spring disposed within the water flushing passage 31A for applying the urging force against the valve stopper 32A so as to normally pull the valve stopper 32A at the top opening of the water flushing passage 31A. As shown in FIG. 8, the resilient element of the retaining element 33A has a biasing end coupling with the valve stopper 32A and an opposed affixing end coupled with a bottom opening end of the water flushing passage 31A to pull the valve stopper 32A on the sealing platform 22A at the top opening of the water flushing passage 31A so as to block the water passing therethrough.

The actuator 45A comprises a driving arm 451A rotatably extended from the power generator 43A to align with the water flushing passage 31A and a pusher arm 452A non-coaxially extended from the driving arm 451A to the valve stopper 32A such that when the driving arm 451A is driven to rotate, the pusher arm 452A is driven to push the valve stopper 32A at the auto-operated opened position, as shown in FIG. 9. Once the driving arm 451A is driven to rotate back to its original position, the pusher arm 542A is moved away from the valve stopper 32A such that the valve stopper 32A is pulled back to the auto-operated closed position, as shown in FIG. 8.

As shown in FIG. 8, the valve stopper 32A has a flat side engaging surface substantially engaged with the pusher arm 452A of the actuator 45A such that when the actuator 45A is driven to rotate, the valve stopper 32A is pushed by the pusher arm 452A at the side engaging surface to unseal the water flushing passage 31A.

Alternatively, the actuator 45A, which has the same structure of the first embodiment, is rotatably extended from the power generator 43A wherein the actuator 45A has a driving end portion 451 downwardly and rotatably extended to contact with the valve stopper 32A. Accordingly, the driving end portion 451 of the actuator 45A, having a semi-circular cross section, has a flat contacting surface 4511 and a curved contacting surface 4512, wherein the driving end portion 451 of the actuator 45A is arranged to be driven to rotate via the power generator 43A to move the valve stopper 32A at the auto-operated closed position that the valve stopper 32A is contacted with the flat contacting surface 4511 of the actuator 45A to retain the valve stopper 32A at the top opening of the water flushing passage 31A for blocking the water passing to the water outlet 112A, and to move the valve stopper 32A at the auto-operated opened position that the valve stopper 32A is contacted with the curved contacting surface 4512 of the actuator 45A to move the valve stopper 32A to offset the top opening of the water flushing passage 31A for allowing the water flushing to the water outlet 112A.

It is worth to mention that when the actuator 45A moves the valve stopper 32A away from the top opening of the water flushing passage 31A, the water within the water chamber 113A is allowed to flow out through the water passage 31A so as to reduce the water pressure within the water chamber 113A. Therefore, the sealing diaphragm 221A is lifted to unseal the water outlet 112A for allowing the water passing to the water outlet 112A, as shown in FIG. 10. At the same time, the water from the water inlet 111A fills up the water chamber 113A through the bleed hole 220A due to the difference of the water pressure. Once the actuator 45A is driven to rotate back to its original position that the valve stopper 32A is pulled back to seal at the top opening of the water flushing passage 31A, the water within the water chamber 113A is blocked to flush to the water flushing passage 31A and is retained back to its original water pressure to stop the water flowing to the water chamber 113A through the bleed hole 220A. Therefore, the sealing diaphragm 221A is dropped down to seal the water outlet 112A again. It is worth to mention that when the sealing diaphragm 221A is lifted up, the valve controlling shaft 23A and the valve stopper 32A are correspondingly lifted within the water chamber 113A. Since the actuator 45A physically contacts with the valve stopper 32A, the valve stopper 32A is allowed to move upwardly without affecting the operation of the actuator 45A.

According to the preferred embodiment, the power generator 43A is an electric motor electrically connected to the CPU 44A wherein the power generator 43A is actuated via the CPU 44A to drive the actuator 45A to rotate. Accordingly, the power generator 43A can be a conventional solenoid electrically connected to the CPU 44A to drive the actuator 45A so as to move the valve stopper 32A between the auto-operated closed position and the auto-operated opened position. It is worth to mention that the electric motor is more reliable than the solenoid because the electric motor provides simple mechanical work rather than using the magnetic force, so as to minimize the failure operation of the power generator 43A and to reduce the maintenance cost of the present invention. Thus, the service life span of the electric motor is longer than that of the solenoid so as to prolong the service life span of the automatic flush actuation apparatus 2A of the present invention.

The CPU 44A comprises a control processor 441A supported in the housing 41A and a sensor 442A which is electrically connected to the control processor 441A. Accordingly, the sensor 442A is an infrared sensor arranged to detect the presence of the user by means of infrared signal in such a manner that when the sensor 442A sends an infrared signal for detecting the presence of the user, the control processor 441A is activates the power generator 43A to actuate valve stopper 32A to open the relief valve 30A for releasing the water.

It is worth to mention that the automatic flush actuation apparatus 2A of the present invention is adapted to incorporate with the toilet flushing system as in first embodiment that when the sensor 442A as an infrared sensor detects the presence of the user, the automatic flush actuation apparatus 2A controls the water flowing to the toilet flushing system. For incorporating with the faucet system, the automatic flush actuation apparatus 2A of the present invention can use an infrared sensor as the sensor 442A to detect the presence of the user to control the water flow. For a water piping system or a showering system, the automatic flush actuation apparatus 2A of the present invention can use a control switch instead of the sensor 442A to actuate the electric motor to control the water flow.

In addition, the automatic flush actuation apparatus 2A of the present invention can achieve both manual and automatic operations for such water systems 1A. Accordingly, the operation lever of the water system 1A can simply communicate with the actuator 45A to control the rotational movement thereof such that when the actuator 45A is manually driven to rotate, the valve stopper 32A is moved offset for allowing the water flushing through the water flushing channel 31A so as to release the water passing from the water inlet 111A to the water outlet 112A.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. An automatic flush actuation apparatus for a water system which comprises a water inlet, a water outlet, and a water chamber communicating between said water inlet and said water outlet, wherein said automatic flush actuation apparatus comprises:

a valve member adapted for being disposed within said water chamber to control water flowing from said water inlet to said water outlet; and a powering assembly, comprising:

a power source;

a power generator;

a CPU electrically connected with said power source to activate said power generator;

a relief valve provided at said valve member for controlling said water flowing from said water chamber to said water outlet, wherein said relief valve has a water flushing passage extended along said valve member for communicating said water chamber with said water outlet, and comprises a valve stopper sitting on said valve member at a top opening of said water flushing passage to sealedly close said water flushing passage for controlling said water flowing to said water outlet, and a resilient element disposed within said water flushing passage for applying an urging force against said valve stopper to retain said valve stopper at said top opening of said water flushing passage so as to normally seal said water flushing passage; and an actuator driven by said power generator to move said relief valve between an auto-operated closed position and an auto-operated opened position, wherein at said auto-operated closed position, said valve stopper is sealedly retained to close said water passage for blocking said water passing to said water outlet, and at said auto-operated opened position, said valve stopper is moved to an opened position by said actuator for releasing said water pressure within said water chamber to allow said water passing to said water outlet.

2. The automatic flush actuation apparatus, as recited in claim 1, wherein said valve member comprises a sealing platform for sealing at said water outlet to normally close said water outlet, and a valve controlling shaft extended from said sealing platform, wherein said water flushing passage is extended along said valve controlling shaft such that when said valve stopper is driven to move to said opened position by said actuator for releasing said water pressure within said water chamber, said sealing platform is lifted up for releasing said water passing from said water inlet to said water outlet.

3. The automatic flush actuation apparatus, as recited in claim 2, wherein said resilient element comprises a compression spring, which is disposed within said water flushing passage, having one end coupling with said valve stopper and another opposed end affixed at a bottom opening of said water flushing passage to pull said valve stopper at said top opening of said water flushing passage so as to retain said valve stopper at said auto-operated closed position.

4. The automatic flush actuation apparatus, as recited in claim 1, wherein said sealing platform has a bleed hole and comprises a sealing diaphragm for movably sealing at said water outlet arranged in such a manner that when said water pressure within said air chamber is reduced, said sealing diaphragm is lifted for unseal said water outlet so as to release said water passing from said water inlet to said water outlet.

5. The automatic flush actuation apparatus, as recited in claim 4, wherein said resilient element comprises a compression spring, which is disposed within said water flushing passage, having one end coupling with said valve stopper and another opposed end affixed at a bottom opening of said water flushing passage to pull said valve stopper at said top opening of said water flushing passage so as to retain said valve stopper at said auto-operated closed position.

6. The automatic flush actuation apparatus, as recited in claim 5, wherein actuator comprises a driving arm rotatably extended from said power generator to align with said water flushing passage and a pusher arm non-coaxially extended from said driving arm to said valve stopper such that when said driving arm is driven to rotate, said pusher arm is driven to push said valve stopper to unseal said top opening of said water flushing passage, and when said driving arm is rotated back to its original position, said pusher arm is moved away from said valve stopper that said valve stopper is returned back to seal at said top opening of said water flushing passage.

7. The automatic flush actuation apparatus, as recited in claim 6, wherein said power generator is an electric motor actuated by said CPU to drive said actuator to rotate.

8. The automatic flush actuation apparatus, as recited in claim 7, wherein said CPU comprises a control processor and a sensor which is electrically connected to said control processor for detecting a presence of a user, so as to actuate said power generator through said control processor.

9. The automatic flush actuation apparatus, as recited in claim 8, wherein said relief valve further comprises a sealing ring mounted on said sealing platform of said valve member around said top opening of said water flushing passage such that said valve stopper is sat on said sealing ring to seal said water flushing passage for blocking said water flushing into said water flushing passage.

10. The automatic flush actuation apparatus, as recited in claim 5, wherein said CPU comprises a control processor and a sensor which is electrically connected to said control processor for detecting a presence of a user, so as to actuate said power generator through said control processor.

11. The automatic flush actuation apparatus, as recited in claim 6, wherein said relief valve further comprises a sealing ring mounted on said sealing platform of said valve member around said top opening of said water flushing passage such that said valve stopper is sat on said sealing ring to seal said water flushing passage for blocking said water flushing into said water flushing passage.

12. An automatic flush actuation apparatus for a water system which comprises a water inlet, a water outlet, and a water chamber communicating between said water inlet and said water outlet, wherein said automatic flush actuation apparatus comprises:

a valve member adapted for being disposed within said water chamber to control water flowing from said water inlet to said water outlet; and a powering assembly, comprising:

a power source;

a power generator;

a CPU electrically connected with said power source to activate said power generator;

a relief valve provided at said valve member for controlling said water flowing from said water chamber to said water outlet, wherein said relief valve has a water flushing passage extended along said valve member for communicating said water chamber with said water outlet and comprises a valve stopper sitting on said valve member at a top opening of said water flushing passage to sealedly close said water flushing passage for controlling said water flowing to said water outlet; and an actuator driven by said power generator to move said relief valve between an auto-operated closed position and an auto-operated opened position, wherein at said auto-operated closed position, said valve stopper is sealedly retained to close said water passage for blocking said water passing to said water outlet, and at said auto-operated opened position, said valve stopper is moved to an opened position by said actuator for releasing said water pressure within said water chamber to allow said water passing to said water outlet, wherein said actuator comprises a driving arm rotatably extended from said power generator to align with said water flushing passage and a pusher arm non-coaxially extended from said driving arm to said valve stopper such that when said driving arm is driven to rotate, said pusher arm is driven to push said valve stopper to unseal said top opening of said water flushing passage, and when said driving arm is rotated back to its original position, said pusher arm is moved away from said valve stopper that said valve stopper is returned back to seal at said top opening of said water flushing passage.

13. The automatic flush actuation apparatus, as recited in claim 12, wherein said sealing platform has a bleed hole and comprises a sealing diaphragm for movably sealing at said water outlet arranged in such a manner that when said water pressure within said air chamber is reduced, said sealing diaphragm is lifted for unseal said water outlet so as to release said water passing from said water inlet to said water outlet.

14. An automatic flush actuation apparatus for a water system which comprises a water inlet, a water outlet, and a water chamber communicating between said water inlet and said water outlet, wherein said automatic flush actuation apparatus comprises:

a valve member adapted for being disposed within said water chamber to control water flowing from said water inlet to said water outlet; and a powering assembly, comprising:

a power source;

a power generator;

a CPU electrically connected with said power source to activate said power generator;

a relief valve provided at said valve member for controlling said water flowing from said water chamber to said water outlet, wherein said relief valve has a water flushing passage extended along said valve member for communicating said water chamber with said water outlet, and comprises a valve stopper sitting on said valve member at a top opening of said water flushing passage to sealedly close said water flushing passage for controlling said water flowing to said water outlet, wherein said valve member comprises a sealing platform for sealing at said water outlet to normally close said water outlet, and a valve controlling shaft extended from said sealing platform, wherein said water flushing passage is extended along said valve controlling shaft such that when said valve stopper is driven to move to said opened position by said actuator for releasing said water pressure within said water chamber, said sealing platform is lifted up for releasing said water passing from said water inlet to said water outlet, wherein said sealing platform has a bleed hole and comprises a sealing diaphragm for movably sealing at said water outlet arranged in such a manner that when said water pressure within said air chamber is reduced, said sealing diaphragm is lifted for unseal said water outlet so as to release said water passing from said water inlet to said water outlet, wherein said relief valve further comprises a sealing ring mounted on said sealing platform of said valve member around said top opening of said water flushing passage such that said valve stopper is sat on said sealing ring to seal said water flushing passage for blocking said water flushing into said water flushing passage; and an actuator driven by said power generator to move said relief valve between an auto-operated closed position and an auto-operated opened position, wherein at said auto-operated closed position, said valve stopper is sealedly retained to close said water passage for blocking said water passing to said water outlet, and at said auto-operated opened position, said valve stopper is moved to an opened position by said actuator for releasing said water pressure within said water chamber to allow said water passing to said water outlet.

* * * * *